United States Patent
Joy et al.

(10) Patent No.: US 9,172,800 B2
(45) Date of Patent: *Oct. 27, 2015

(54) SYSTEMS AND METHODS TO DISABLE A CALL BLOCK

(75) Inventors: Jennifer Lynne Joy, Austin, TX (US); Markus Weber, Pflugerville, TX (US); Thomas Bradley Scholl, New Haven, CT (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 916 days.

This patent is subject to a terminal disclaimer.

(21) Appl. No.: 12/636,841

(22) Filed: Dec. 14, 2009

(65) Prior Publication Data

US 2010/0091969 A1    Apr. 15, 2010

Related U.S. Application Data

(63) Continuation of application No. 11/434,673, filed on May 16, 2006, now Pat. No. 7,657,009.

(51) Int. Cl.
*H04M 3/42*  (2006.01)
*H04M 3/436*  (2006.01)

(52) U.S. Cl.
CPC .......... *H04M 3/436* (2013.01); *H04M 3/42059* (2013.01); *H04M 2201/12* (2013.01); *H04M 2201/18* (2013.01)

(58) Field of Classification Search
CPC .......... H04M 3/42153; H04M 3/2281; H04M 3/493; H04M 3/42008; H04M 2203/2072; H04M 3/436

USPC ................. 379/90.02, 207.03, 210.02, 207.1, 379/91.02, 142.02

See application file for complete search history.

(56) References Cited

U.S. PATENT DOCUMENTS

| | | | |
|---|---|---|---|
| 5,070,525 A * | 12/1991 | Szlam et al. .................. 379/196 |
| 5,467,388 A * | 11/1995 | Redd et al. ............... 379/210.02 |
| 5,495,521 A | 2/1996 | Rangachar | |
| 5,638,430 A | 6/1997 | Hogan et al. | |
| 5,696,817 A | 12/1997 | Yatsu | |
| 6,009,469 A * | 12/1999 | Mattaway et al. ............ 709/227 |
| 6,185,412 B1 | 2/2001 | Pentikainen et al. | |
| 6,259,779 B1 | 7/2001 | Council et al. | |
| 6,327,346 B1 * | 12/2001 | Infosino ..................... 379/88.02 |
| 6,359,970 B1 | 3/2002 | Burgess | |
| 6,449,479 B1 * | 9/2002 | Sanchez ........................ 455/433 |
| 6,556,666 B1 | 4/2003 | Beyda et al. | |
| 6,606,505 B1 * | 8/2003 | Chow et al. ................... 455/555 |
| 6,788,775 B1 | 9/2004 | Simpson | |
| 6,987,843 B1 * | 1/2006 | Barclay et al. ........... 379/100.06 |
| 6,990,187 B2 | 1/2006 | MacNamara et al. | |
| 7,162,022 B2 | 1/2007 | Jupe et al. | |

(Continued)

OTHER PUBLICATIONS

Non-Final Office Action for U.S. Appl. No. 11/434,673 received from the United States Patent and Trademark Office (USPTO) mailed Jun. 18, 2009, 16 pages.

(Continued)

*Primary Examiner* — Akelaw Teshale
(74) *Attorney, Agent, or Firm* — Toler Law Group, PC

(57) ABSTRACT

A computer implemented method includes outputting a dial tone from a call block system. The dial tone indicates to a calling party that a call block feature is enabled for a party. The computer implemented method includes storing messages for the party when the call block feature is enabled.

18 Claims, 2 Drawing Sheets

(56) References Cited

U.S. PATENT DOCUMENTS

| | | | |
|---|---|---|---|
| 8,548,156 B2 * | 10/2013 | Shaffer et al. | 379/265.02 |
| 2002/0064149 A1 * | 5/2002 | Elliott et al. | 370/352 |
| 2002/0114431 A1 * | 8/2002 | McBride et al. | 379/88.21 |
| 2003/0043983 A1 | 3/2003 | Pelletier et al. | |
| 2004/0029564 A1 | 2/2004 | Hodge | |
| 2004/0114747 A1 | 6/2004 | Trandal et al. | |
| 2004/0141598 A1 | 7/2004 | Moss et al. | |
| 2004/0213396 A1 | 10/2004 | MacNamara et al. | |
| 2004/0266405 A1 | 12/2004 | Benco et al. | |
| 2005/0013424 A1 | 1/2005 | Pelletier et al. | |
| 2005/0074109 A1 | 4/2005 | Hanson et al. | |
| 2005/0117714 A1 | 6/2005 | Chingon et al. | |
| 2005/0117730 A1 * | 6/2005 | Mullis et al. | 379/210.02 |
| 2005/0124316 A1 | 6/2005 | Islam et al. | |
| 2005/0207557 A1 | 9/2005 | Dolan et al. | |
| 2005/0238160 A1 | 10/2005 | Sunstrum | |
| 2005/0243974 A1 | 11/2005 | Pearson | |
| 2006/0036727 A1 * | 2/2006 | Kurapati et al. | 709/224 |
| 2006/0067501 A1 | 3/2006 | Piatt | |
| 2006/0072548 A1 | 4/2006 | Mundra et al. | |
| 2006/0291641 A1 * | 12/2006 | Barclay et al. | 379/211.03 |

OTHER PUBLICATIONS

Notice of Allowance and Fee(s) Due for U.S. Appl. No. 11/434,673 received from the United States Patent and Trademark Office (USPTO) mailed Nov. 3, 2009, 10 pages.

* cited by examiner

SYSTEMS AND METHODS TO DISABLE A CALL BLOCK

CLAIM OF PRIORITY

The present application claims priority from and is a continuation of U.S. patent application Ser. No. 11/434,673 filed on May 16, 2006 and entitled "Call Block Disabler", the contents of which are expressly incorporated herein by reference in their entirety.

FIELD OF THE DISCLOSURE

The present disclosure is generally related to methods and systems of disabling a call block.

BACKGROUND

Call blocking systems enable users to block incoming telephone calls. A user can enter a list of phone numbers of potential calling parties whose incoming telephone calls are to bypass the call blocking feature.

BRIEF DESCRIPTION

DETAILED DESCRIPTION

Disclosed herein are embodiments of methods and systems that enhance features provided by a call blocking system. A call block feature can be disabled or bypassed, under particular conditions, to provide a way for trusted people to remain in communication in case of an emergency.

A computer implemented method includes outputting a dial tone from a call block system. The dial tone indicates to a calling party that a call block feature is enabled for a party. The computer implemented method includes storing messages for the party when the call block feature is enabled.

A computer-readable storage medium includes operational instructions that, when executed by a processor, cause the processor to initiate a call from a calling party to a called party. The computer-readable medium further includes operational instructions that, when executed by the processor, cause the processor to receive, from a call blocking system, a dial tone indicating that the called party has a call blocking feature enabled. The computer-readable medium further includes operational instructions that, when executed by the processor, cause the processor to cause a message for the called party to be stored at the call blocking system.

A voice telephony device includes a processor and a computer readable storage medium. The computer readable storage medium includes operational instructions that, when executed by the processor, cause the processor to instruct a call block system to enable a call block feature for the device for a particular period of time. The call block feature prevents the device from receiving incoming calls during the particular period of time. The call block system stores messages from incoming calls addressed to the device when the call block feature is enabled.

Figure 1:
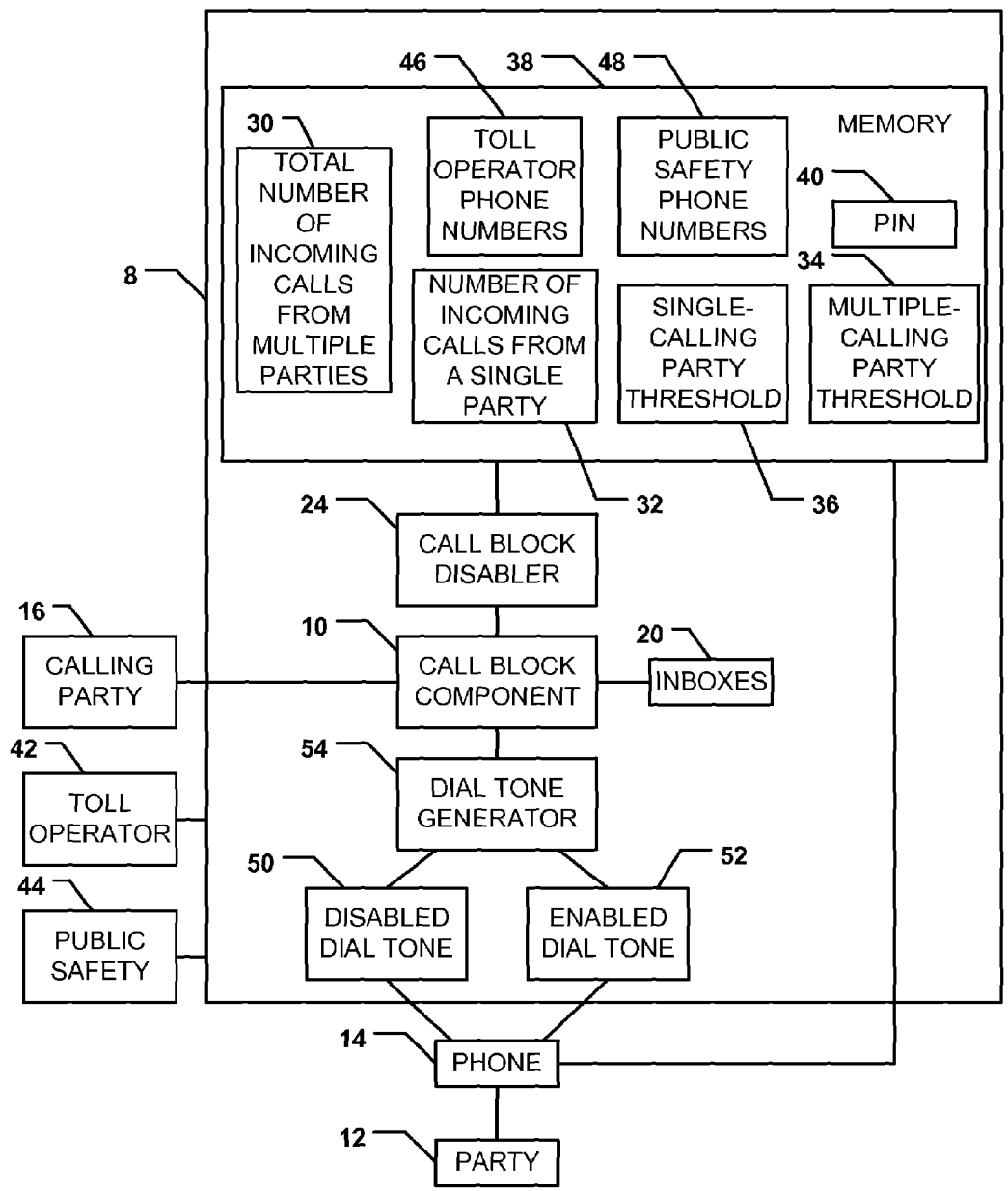
FIG. 1 is a block diagram of an embodiment of a call block system.

FIG. 1 is a block diagram of an embodiment of a call block system 8. The system 8 comprises a call block component 10 that provides a call block feature for any of a plurality of parties of a telephone system. The call block component 10 may provide a do-not-disturb feature, a snooze feature, or another call block feature that enables each party to control whether or not incoming calls to its phone are to be blocked. The call block feature may be a timed call block feature that blocks incoming calls for a particular time period and/or until a particular end time, and thereafter does not block incoming calls. Each party may configure its own particular time period and/or end time. The timed call block feature may be enabled, for example, for a mobile telephone of a person who is to attend a meeting, for a telephone of a person who is to take a nap, or for a telephone of a family who wishes not to be disturbed during a meal. Optionally, user interaction with the call block feature is enabled through a privacy manager feature of the telephone system.

Each party may configure an amount of time that the call block feature is enabled for its phone. When the call block feature is enabled for a party 12, an incoming phone call for the party 12 does not cause the party's phone 14 to ring. Although the party's phone 14 is not ringing, the call block component 10 may provide a ringing signal to a calling party 16 and/or may play a message to inform the calling party 16 that the party 12 does not want to be disturbed. Optionally, the call block component 10 may provide, for each party, an associated inbox 20 to receive messages for the party when the call block feature is enabled for the party. The messages can be left by calling parties whose calls are blocked. Each party can play back recorded messages in its associated inbox 20.

The call block component 10 is responsive to a call block disabler 24. The call block disabler 24 acts to disable the call block feature for a party based on one or more conditions. By disabling an otherwise enabled call block feature for the party 12, one or more subsequent incoming phone calls for the party 12 are not blocked, and thus can cause the party's phone 14 to ring. Examples of the one or more conditions for disabling the call block feature are as follows.

The call block disabler 24 can count one or more respective numbers of incoming calls for each party whose call block feature is enabled. The call block disabler 24 can disable the call block feature for a party in response to a number of incoming calls for the party being greater than or equal to a threshold. This feature allows the call block feature to be automatically disabled for a party if an unusually large number of calls intended for the party have been blocked. This feature addresses situations where repeated attempts are made to contact the party within a short period of time, for example. The threshold(s) for a party can be configured by the party using his/her phone.

The number of incoming calls may be a total number of incoming calls 30 for the party from a plurality of calling parties while the call block feature is enabled for the party. Alternatively, the number of incoming calls may be a number of incoming calls 32 from one calling party while the call block feature is enabled for the party.

Running counts of the total number of incoming calls 30 and the number of incoming calls 32 are stored in a memory 38. The counts are initialized (e.g. to zero) for a party when the party enables the call block feature.

The system 8 may store a multiple-calling-party threshold 34 and/or a single-calling-party threshold 36 in the memory 38. The call block disabler 24 can use the multiple-calling-party threshold 34 for disabling the call block feature based on the total number of incoming calls 30 from a plurality of calling parties. The call block disabler 24 can use the single-calling-party threshold 36 for disabling the call block feature based on the number of incoming calls 32 from one calling party. The multiple-calling-party threshold 34 may differ from (e.g., be greater than) the single-calling-party threshold 36. Each party may configure its own multiple-calling-party threshold and its own single-calling-party threshold.

The call block disabler 24 can cause an incoming call to bypass the call block feature if a calling party enters a particular personal identification number (PIN) 40 or an alternative pass code associated with the called party. Each party can configure its own PIN or alternative pass code with the call block disabler 24 for storage in the memory 38. Each party can share its PIN or alternative pass codes with a limited number of trusted parties. The PIN 40 or alternative pass code may cause only the incoming call to bypass the call block feature, or may cause the call block feature to be disabled for subsequent incoming calls to the party. Use of the PIN 40 or alternative pass code enables the call block feature to be remotely disabled.

The call block disabler 24 can cause any incoming call from a toll operator 42 or a public safety party 44 (e.g., police, fire, E911) to bypass the call block feature. One or more toll operator phone numbers 46 and/or one or more public safety phone numbers 48 can be stored in the memory 38 for access by the call block disabler 24.

The call block component 10 may output different dial tones to a party dependent on whether its call block feature is enabled or disabled. For example, the call block component 10 can output a first particular dial tone 50 to a party whose call block feature is disabled, and a second particular dial tone 52 to a party whose call block feature is enabled. The first particular dial tone 50 may comprise a standard dial tone presented to parties of the telephone system. The second particular dial tone 52 differs from and is audibly distinguishable from the first particular dial tone 50. The second particular dial tone 52 is dedicated to indicate that the call block feature is enabled for the party. When the party 12 puts its phone 14 in an off-hook state while its call block feature is enabled, the phone 14 presents the second particular dial tone 52 to the party 12. The second particular dial tone 52 serves to remind the party 12 that the call block feature is enabled for the phone. The second particular dial tone 52 may be outputted regardless of whether the associated inbox 20 for the party 12 is empty or otherwise not full, or is full. The second particular dial tone 52 (and optionally the first particular dial tone 50) is outputted by a dial tone generator 54.

Figure 2:
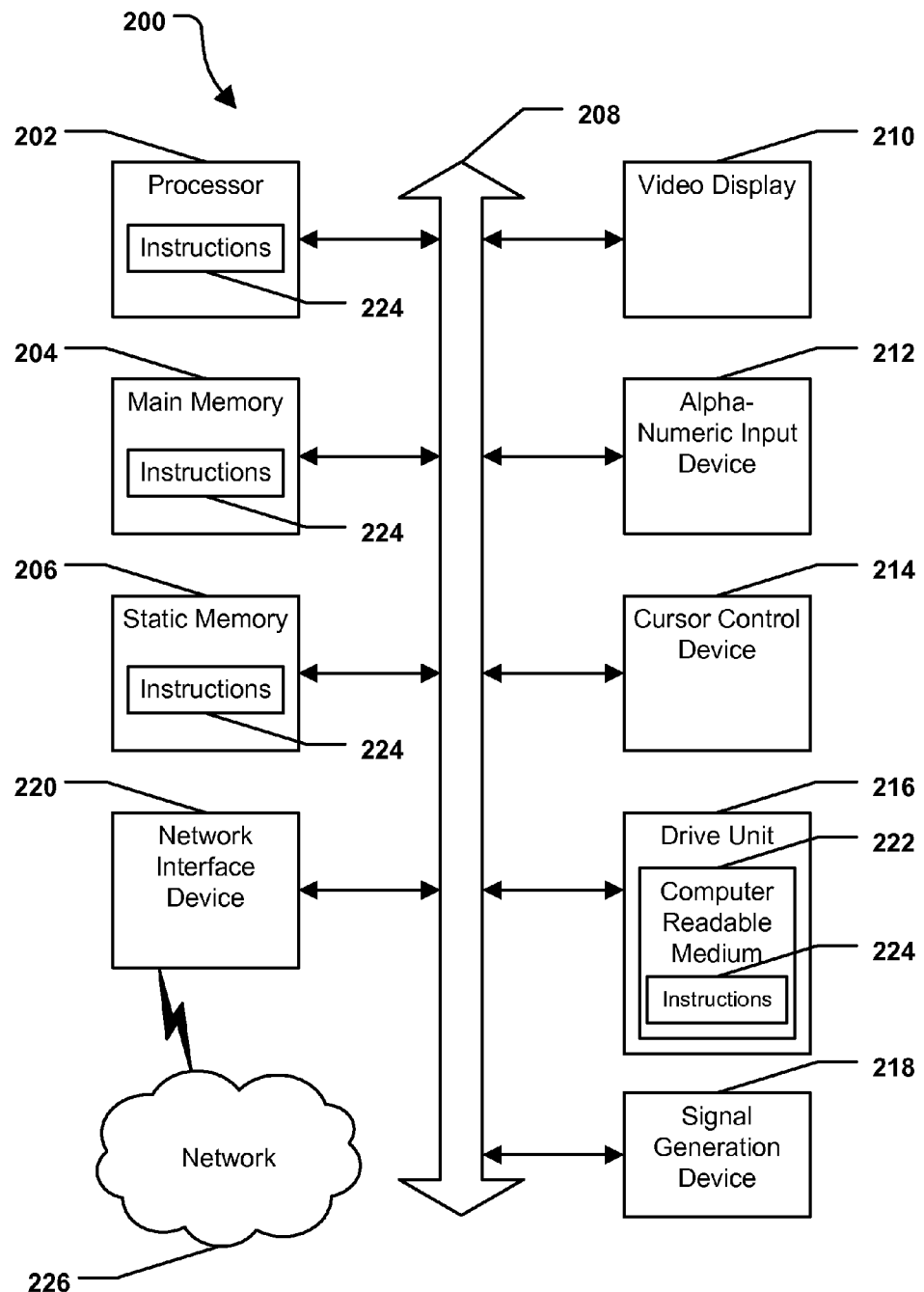
FIG. 2 is a block diagram of an illustrative embodiment of a general computer system.

Referring to FIG. 2, an illustrative embodiment of a general computer system is shown and is designated 200. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. Moreover, the computer system 200 can include a main memory 204 and a static memory 206, that can communicate with each other via a bus 208. As shown, the computer system 200 may further include a video display unit 210, such as a liquid crystal display (LCD), an organic light emitting diode (OLED), a flat panel display, a solid state display, or a cathode ray tube (CRT). Additionally, the computer system 200 may include an input device 212, such as a keyboard, and a cursor control device 214, such as a mouse. The computer system 200 can also include a disk drive unit 216, a signal generation device 218, such as a speaker or remote control, and a network interface device 220.

In a particular embodiment, as depicted in FIG. 2, the disk drive unit 216 may include a computer-readable medium 222 in which one or more sets of instructions 224, e.g. software, can be embedded. Further, the instructions 224 may embody one or more of the methods or logic as described herein. In a particular embodiment, the instructions 224 may reside completely, or at least partially, within the main memory 204, the static memory 206, and/or within the processor 202 during execution by the computer system 200. The main memory 204 and the processor 202 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 224 or receives and executes instructions 224, so that a device connected to a network 226 can communicate voice, video or data over the network 226. Further, the instructions 224 may be transmitted or received over the network 226 via the network interface device 220.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include a computer-readable medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    making a determination, at a call block system, whether a call block feature is enabled for a communication device based on a number of incoming calls from a particular calling device being less than a single-calling-party threshold and based on a total number of incoming calls being less than a multiple-calling-party threshold, wherein the single-calling-party threshold corresponds to a permitted number of incoming calls from one calling device, wherein the multiple-calling-party threshold corresponds to a permitted number of incoming calls from a plurality of calling parties, and wherein the single-calling-party threshold is distinct from the multiple-calling-party threshold;
    when the determination indicates the call block feature is disabled for the communication device, outputting a first dial tone from the call block system to the communication device; and
    when the determination indicates the call block feature is enabled for the communication device, outputting a second dial tone from the call block system to the communication device to indicate that the call block feature is enabled, wherein the second dial tone is audibly distinct from the first dial tone.

2. The method of claim 1, further comprising temporarily blocking incoming calls for a particular time period after receiving blocking instructions from the communication device to enable the call block feature, the blocking instructions including the particular time period.

3. The method of claim 2, further comprising enabling the communication device to receive the incoming calls after the particular time period elapses.

4. The method of claim 1, further comprising temporarily blocking incoming calls until a particular end time after receiving blocking instructions from the communication device to enable the call block feature, the blocking instructions specifying the particular end time.

5. The method of claim 4, further comprising enabling the communication device to receive the incoming calls after the particular end time elapses.

6. The method of claim 5, further comprising:
    storing a message for the communication device while the call block feature is enabled; and
    playing back the message in response to receiving a message playback instruction from the communication device.

7. The method of claim 1, further comprising:
    determining that an incoming call is from a public safety party; and
    bypassing the call block feature when the incoming call is from the public safety party.

8. The method of claim 7, wherein determining that the incoming call is from the public safety party comprises comparing a phone number associated with the public safety party to a set of phone numbers of public safety parties stored at the call block system.

9. The method of claim 1, wherein the second dial tone is output independent of whether an inbox associated with the party is full.

10. An apparatus comprising:
a processor; and
a memory storing:
    a single-calling-party threshold corresponding to a permitted number of incoming calls from one calling device to a communication device;
    a multiple-calling-party threshold that differs from the single-calling-party threshold, the multiple-calling-party threshold corresponding to a permitted number of incoming calls from a plurality of calling parties to the communication device; and
    instructions that, when executed by the processor, cause the processor to perform operations including:
        enabling a call block feature for the communication device;
        maintaining enablement of the call block feature for the communication device in response to a number of incoming calls to the communication device from a particular calling device being less than the single-calling-party threshold and in response to a total number of incoming calls to the communication device being less than the multiple-calling-party threshold; and
        disabling the call block feature for the communication device in response to the number of incoming calls to the communication device from the particular calling device being equal to the single-calling-party threshold or in response to the total number of incoming calls to the communication device being equal to the multiple-calling-party threshold.

11. The apparatus of claim 10, wherein the operations further include receiving data from a particular calling device in connection with a call from the particular calling device to the communication device and, in response to the data, temporarily disabling the call block feature for the communication device with respect to the particular calling device.

12. The apparatus of claim 10, wherein the operations further include receiving data from a particular calling device, the data corresponding to a call from the particular calling device to the communication device and, in response to the data, disabling the call block feature for the communication device with respect to the call and subsequent calls.

13. The apparatus of claim 10, wherein the memory stores a particular multiple-calling-party threshold and a particular single-calling-party threshold for each of a plurality of subscribers.

14. An apparatus comprising:
a call block component configured to, when a call block feature for a first party is enabled, prevent a communication device associated with the first party from ringing in response to an incoming call; and
a call block disabler configured to:
    make a determination whether a call block feature is enabled for the first party based on a number of incoming calls from a particular device satisfying a single-calling-party threshold and based on a total number of incoming calls satisfying a multiple-calling-party threshold;
    receive data from a second party via a call from the second party to the first party when the determination indicates the call block feature is enabled for the first party; and
    in response to the data, disable the call block feature for the first party with respect to the call and subsequent calls.

15. The apparatus of claim 14, further comprising:
a dial tone generator configured to:
    when the call block feature is disabled for the first party, output a first dial tone to the communication device associated with the first party; and
    when the call block feature is enabled for the first party, output a second dial tone to the communication device associated with the first party to indicate to the first party that the call block feature is enabled for the first party, wherein the second dial tone is audibly distinct from the first dial tone.

16. The apparatus of claim 15, wherein the dial tone generator is further configured to output the second dial tone independent of whether an inbox associated with the first party is full.

17. The apparatus of claim 14, further comprising a memory to store the single-calling-party threshold and the multiple-calling-party threshold, wherein the single-calling-party threshold corresponds to a permitted number of incoming calls from one calling device, and wherein the multiple-calling-party threshold corresponds to a permitted number of incoming calls from a plurality of calling parties.

18. A method comprising:
making a determination, at a communication device, whether a call block feature is enabled for the communication device based on a number of incoming calls from a particular calling device being less than a single-calling-party threshold and based on a total number of incoming calls being less than a multiple-calling-party threshold, wherein the single-calling-party threshold corresponds to a permitted number of incoming calls from one calling device, wherein the multiple-calling-party threshold corresponds to a permitted number of incoming calls from a plurality of calling parties, and wherein the single-calling-party threshold is distinct from the multiple-calling-party threshold;
when the determination indicates that the call block feature is disabled, outputting a first dial tone at the communication device; and
when the determination indicates that the call block feature is enabled, outputting a second dial tone at the communication device to indicate that the call block feature is enabled, wherein the second dial tone is audibly distinct from the first dial tone.

* * * * *